United States Patent
Satou

(10) Patent No.: US 7,962,753 B2
(45) Date of Patent: Jun. 14, 2011

(54) METHOD AND A CIRCUIT FOR SHA OPERATION WITH POWER SAVED

(75) Inventor: Hiroshi Satou, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 907 days.

(21) Appl. No.: 11/873,496

(22) Filed: Oct. 17, 2007

(65) Prior Publication Data
US 2008/0107259 A1 May 8, 2008

(30) Foreign Application Priority Data

Nov. 8, 2006 (JP) .................. 2006-302202

(51) Int. Cl.
*H04L 9/32* (2006.01)
*G06F 11/30* (2006.01)
*G06F 12/14* (2006.01)
*H04K 1/00* (2006.01)
*H04L 9/00* (2006.01)
*H04L 9/28* (2006.01)
*H04L 9/30* (2006.01)

(52) U.S. Cl. .......... 713/180; 713/168; 713/189; 380/28; 380/30

(58) Field of Classification Search .................. None
See application file for complete search history.

(56) References Cited

U.S. PATENT DOCUMENTS

| 7,299,355 | B2 * | 11/2007 | Qi | 713/168 |
| 7,376,685 | B2 * | 5/2008 | Lee et al. | 708/200 |
| 7,403,614 | B2 * | 7/2008 | Sato | 380/30 |
| 2002/0066014 | A1 * | 5/2002 | Dworkin et al. | 713/168 |
| 2004/0260740 | A1 * | 12/2004 | Liu | 708/490 |

FOREIGN PATENT DOCUMENTS

| JP | 2002-287635 | 10/2002 |
| JP | 2004-240298 | 8/2004 |

* cited by examiner

*Primary Examiner* — Shin-Hon Chen
(74) *Attorney, Agent, or Firm* — Studebaker & Brackett PC; Donald R. Studebaker

(57) ABSTRACT

A Secure Hash Algorithm (SHA) operation circuit includes plural storages for storing the variables of the SHA calculation, a permutation section for permuting the output signals of the storages, and an arithmetic unit for calculating a temporary value by the use of the output signals of the storages and a data segment successively extracted from input data from which the hash value is to be obtained. When each data segment is processed, some of the storages are supplied with no clock signal and thereby maintain the values stored therein without change. The SHA operation circuit is thus capable of saving power.

7 Claims, 9 Drawing Sheets

Fig. 1A

| PROCESS | a | b | c | d | e |
|---|---|---|---|---|---|
| Initialize | $H_0^{(i-1)}$ | $H_1^{(i-1)}$ | $H_2^{(i-1)}$ | $H_3^{(i-1)}$ | $H_4^{(i-1)}$ |
| t=0 | TEMP | a | $ROTL^{30}(b)$ | c | d |
| t=1 | TEMP | a | $ROTL^{30}(b)$ | c | d |
| t=2 | TEMP | a | $ROTL^{30}(b)$ | c | d |
| t=3 | TEMP | a | $ROTL^{30}(b)$ | c | d |
| t=4 | TEMP | a | $ROTL^{30}(b)$ | c | d |
| t=5 | TEMP | a | $ROTL^{30}(b)$ | c | d |
| t=6 | TEMP | a | $ROTL^{30}(b)$ | c | d |
| t=7 | TEMP | a | $ROTL^{30}(b)$ | c | d |
| t=8 | TEMP | a | $ROTL^{30}(b)$ | c | d |
| t=9 | TEMP | a | $ROTL^{30}(b)$ | c | d |
| ⋮ | ⋮ | ⋮ | ⋮ | ⋮ | ⋮ |
| t=70 | TEMP | a | $ROTL^{30}(b)$ | c | d |
| t=71 | TEMP | a | $ROTL^{30}(b)$ | c | d |
| t=72 | TEMP | a | $ROTL^{30}(b)$ | c | d |
| t=73 | TEMP | a | $ROTL^{30}(b)$ | c | d |
| t=74 | TEMP | a | $ROTL^{30}(b)$ | c | d |
| t=75 | TEMP | a | $ROTL^{30}(b)$ | c | d |
| t=76 | TEMP | a | $ROTL^{30}(b)$ | c | d |
| t=77 | TEMP | a | $ROTL^{30}(b)$ | c | d |
| t=78 | TEMP | a | $ROTL^{30}(b)$ | c | d |
| t=79 | TEMP | a | $ROTL^{30}(b)$ | c | d |

Fig. 1B

| PROCESS | $H_0^{(i)}$ | $H_1^{(i)}$ | $H_2^{(i)}$ | $H_3^{(i)}$ | $H_4^{(i)}$ |
|---|---|---|---|---|---|
| Compute | $H_0^{(i-1)}+a$ | $H_1^{(i-1)}+b$ | $H_2^{(i-1)}+c$ | $H_3^{(i-1)}+d$ | $H_4^{(i-1)}+e$ |

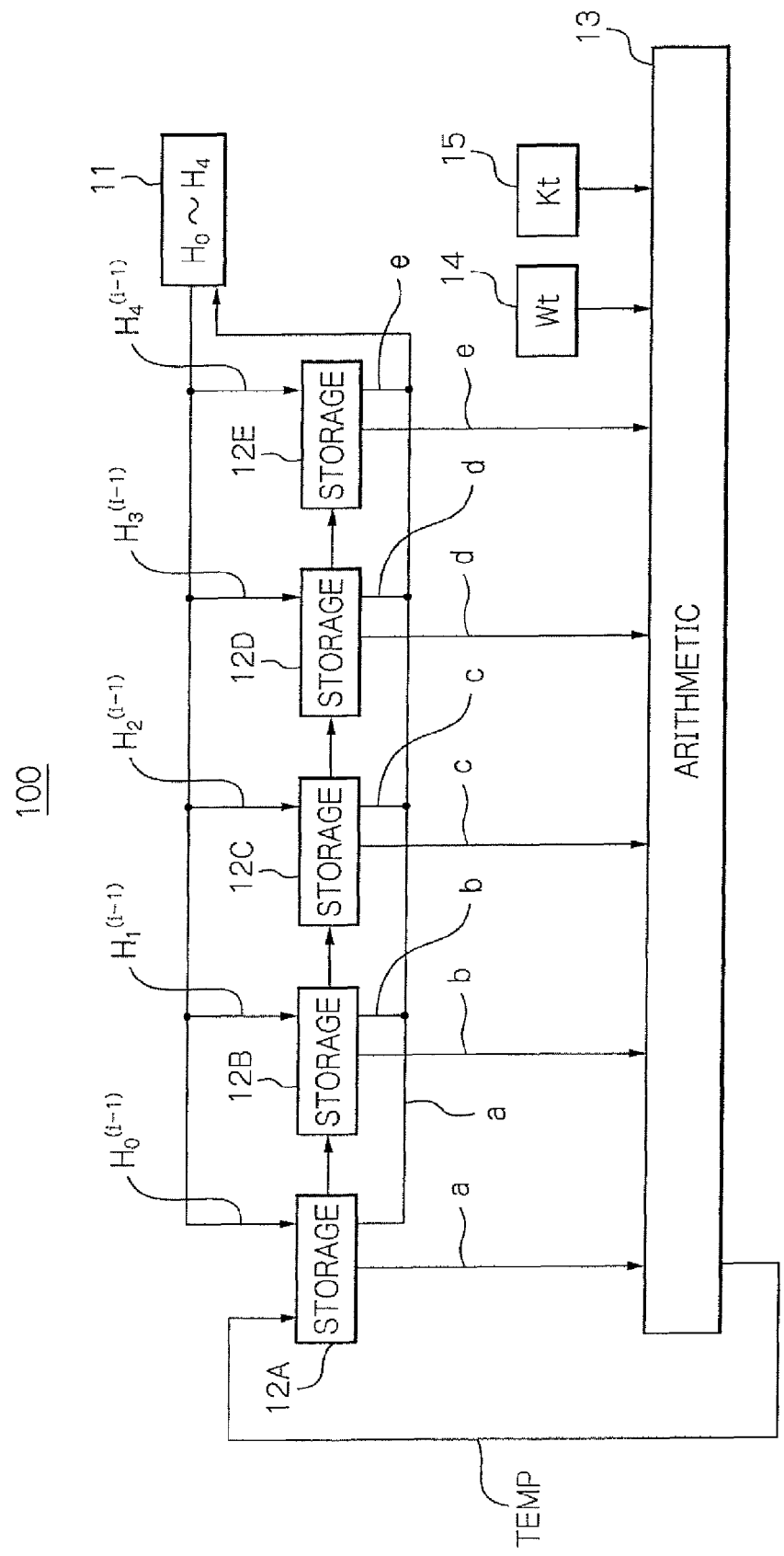

Fig. 3A

| PROCESS | a | b | c | d | e | v | w | x | y | z |
|---|---|---|---|---|---|---|---|---|---|---|
| Initialize | $H_0^{(i-1)}$ | $H_1^{(i-1)}$ | $H_2^{(i-1)}$ | $H_3^{(i-1)}$ | $H_4^{(i-1)}$ | - | - | - | - | - |
| t=0 | a | $ROTL^{30}(b)$ | c | d | TEMP | a | b | c | d | e |
| t=1 | $ROTL^{30}(a)$ | b | c | TEMP | e | e | a | b | c | d |
| t=2 | a | b | TEMP | d | $ROTL^{30}(e)$ | d | e | a | b | c |
| t=3 | a | TEMP | c | $ROTL^{30}(d)$ | e | c | d | e | a | b |
| t=4 | TEMP | b | $ROTL^{30}(c)$ | d | e | b | c | d | e | a |
| t=5 | a | $ROTL^{30}(b)$ | c | d | TEMP | a | b | c | d | e |
| t=6 | $ROTL^{30}(a)$ | b | c | TEMP | e | e | a | b | c | d |
| t=7 | a | b | TEMP | d | $ROTL^{30}(e)$ | d | e | a | b | c |
| t=8 | a | TEMP | c | $ROTL^{30}(d)$ | e | c | d | e | a | b |
| t=9 | TEMP | b | $ROTL^{30}(c)$ | d | e | b | c | d | e | a |
| ... | ... | ... | ... | ... | ... | ... | ... | ... | ... | ... |
| t=70 | a | $ROTL^{30}(b)$ | c | d | TEMP | a | b | c | d | e |
| t=71 | $ROTL^{30}(a)$ | b | c | TEMP | e | e | a | b | c | d |
| t=72 | a | b | TEMP | d | $ROTL^{30}(e)$ | d | e | a | b | c |
| t=73 | a | TEMP | c | $ROTL^{30}(d)$ | e | c | d | e | a | b |
| t=74 | TEMP | b | $ROTL^{30}(c)$ | d | e | b | c | d | e | a |
| t=75 | a | $ROTL^{30}(b)$ | c | d | TEMP | a | b | c | d | e |
| t=76 | $ROTL^{30}(a)$ | b | c | TEMP | e | e | a | b | c | d |
| t=77 | a | b | TEMP | d | $ROTL^{30}(e)$ | d | e | a | b | c |
| t=78 | a | TEMP | c | $ROTL^{30}(d)$ | e | c | d | e | a | b |
| t=79 | TEMP | b | $ROTL^{30}(c)$ | d | e | b | c | d | e | a |

Fig. 3B

| PROCESS | $H_0^{(i)}$ | $H_1^{(i)}$ | $H_2^{(i)}$ | $H_3^{(i)}$ | $H_4^{(i)}$ |
|---|---|---|---|---|---|
| Compute | $H_0^{(i-1)}+a$ | $H_1^{(i-1)}+b$ | $H_2^{(i-1)}+c$ | $H_3^{(i-1)}+d$ | $H_4^{(i-1)}+e$ |

Fig. 6A

| PROCESS | a | b | c | d | e | v | w | xtemp | ytemp | ztemp |
|---|---|---|---|---|---|---|---|---|---|---|
| Initialize | $H_0^{(i-1)}$ | $H_1^{(i-1)}$ | $ROTR^{30}(H_2^{(i-1)})$ | $ROTR^{30}(H_3^{(i-1)})$ | $ROTR^{30}(H_4^{(i-1)})$ | — | — | — | — | — |
| t=0 | a | b | c | d | TEMP | a | b | c | d | e |
| t=1 | a | b | c | TEMP | e | e | a | b | c | d |
| t=2 | a | b | TEMP | d | e | d | e | a | b | c |
| t=3 | TEMP | b | c | d | e | c | d | e | a | b |
| t=4 | a | TEMP | c | d | e | b | c | d | e | a |
| t=5 | a | b | c | TEMP | e | a | b | c | d | e |
| t=6 | a | b | TEMP | d | e | e | a | b | c | d |
| t=7 | a | TEMP | c | d | e | d | e | a | b | c |
| t=8 | TEMP | b | c | d | e | c | d | e | a | b |
| t=9 | a | b | c | d | e | b | a | e | a | e |
| ... | ... | ... | ... | ... | ... | ... | ... | ... | ... | ... |
| t=70 | a | b | c | d | TEMP | a | b | c | d | e |
| t=71 | a | b | c | TEMP | e | e | a | b | c | d |
| t=72 | a | b | TEMP | d | e | d | e | a | b | c |
| t=73 | TEMP | b | c | d | e | c | d | e | a | b |
| t=74 | a | TEMP | c | d | e | b | c | d | e | a |
| t=75 | a | b | c | TEMP | e | a | b | c | d | e |
| t=76 | a | b | TEMP | d | e | e | a | b | c | d |
| t=77 | a | TEMP | c | d | e | d | c | b | a | e |
| t=78 | a | b | TEMP | d | e | c | d | e | a | d |
| t=79 | TEMP | b | c | d | e | b | c | d | e | a |

Fig. 6B

| PROCESS | $H_0^{(i)}$ | $H_1^{(i)}$ | $H_2^{(i)}$ | $H_3^{(i)}$ | $H_4^{(i)}$ |
|---|---|---|---|---|---|
| Compute | $H_0^{(i-1)}+a$ | $H_1^{(i-1)}+b$ | $H_2^{(i-1)}+ROTL^{30}(c)$ | $H_3^{(i-1)}+ROTL^{30}(d)$ | $H_4^{(i-1)}+ROTL^{30}(e)$ |

Fig. 7A

| PROCESS | a | b | c | d | e | f | g | h |
|---|---|---|---|---|---|---|---|---|
| Initialize | $H_0^{(i-1)}$ | $H_1^{(i-1)}$ | $H_2^{(i-1)}$ | $H_3^{(i-1)}$ | $H_4^{(i-1)}$ | $H_5^{(i-1)}$ | $H_6^{(i-1)}$ | $H_7^{(i-1)}$ |
| t=0 | $T_1+T_2$ | a | b | c | $T_3$ | e | f | g |
| t=1 | $T_1+T_2$ | a | b | c | $T_3$ | e | f | g |
| t=2 | $T_1+T_2$ | a | b | c | $T_3$ | e | f | g |
| t=3 | $T_1+T_2$ | a | b | c | $T_3$ | e | f | g |
| t=4 | $T_1+T_2$ | a | b | c | $T_3$ | e | f | g |
| t=5 | $T_1+T_2$ | a | b | c | $T_3$ | e | f | g |
| t=6 | $T_1+T_2$ | a | b | c | $T_3$ | e | f | g |
| t=7 | $T_1+T_2$ | a | b | c | $T_3$ | e | f | g |
| ⋮ | ⋮ | ⋮ | ⋮ | ⋮ | ⋮ | ⋮ | ⋮ | ⋮ |
| t=60 | $T_1+T_2$ | a | b | c | $T_3$ | e | f | g |
| t=61 | $T_1+T_2$ | a | b | c | $T_3$ | e | f | g |
| t=62 | $T_1+T_2$ | a | b | c | $T_3$ | e | f | g |
| t=63 | $T_1+T_2$ | a | b | c | $T_3$ | e | f | g |
| ⋮ | ⋮ | ⋮ | ⋮ | ⋮ | ⋮ | ⋮ | ⋮ | ⋮ |
| t=76 | $T_1+T_2$ | a | b | c | $T_3$ | e | f | g |
| t=77 | $T_1+T_2$ | a | b | c | $T_3$ | e | f | g |
| t=78 | $T_1+T_2$ | a | b | c | $T_3$ | e | f | g |
| t=79 | $T_1+T_2$ | a | b | c | $T_3$ | e | f | g |

Fig. 7B

| PROCESS | $H_0^{(i)}$ | $H_1^{(i)}$ | $H_2^{(i)}$ | $H_3^{(i)}$ | $H_4^{(i)}$ | $H_5^{(i)}$ | $H_6^{(i)}$ | $H_7^{(i)}$ |
|---|---|---|---|---|---|---|---|---|
| Compute | $H_0^{(i-1)}$+a | $H_1^{(i-1)}$+b | $H_2^{(i-1)}$+c | $H_3^{(i-1)}$+d | $H_4^{(i-1)}$+e | $H_5^{(i-1)}$+f | $H_6^{(i-1)}$+g | $H_7^{(i-1)}$+h |

Fig. 8A

| PROCESS | a | b | c | d | e | f | g | h | w0 | x0 | y0 | z0 | w1 | x1 | y1 | z1 |
|---|---|---|---|---|---|---|---|---|---|---|---|---|---|---|---|---|
| Initialize | $H_0^{(i-1)}$ | $H_1^{(i-1)}$ | $H_2^{(i-1)}$ | $H_3^{(i-1)}$ | $H_4^{(i-1)}$ | $H_5^{(i-1)}$ | $H_6^{(i-1)}$ | $H_7^{(i-1)}$ | – | – | – | – | – | – | – | – |
| t=0 | a | b | c | $T_1+T_2$ | e | f | g | $T_3$ | a | b | c | d | e | f | g | h |
| t=1 | a | b | c | d | e | f | g | h | d | a | b | c | h | e | f | g |
| t=2 | a | b | $T_1+T_2$ | d | e | $T_3$ | g | h | c | d | a | b | g | h | e | f |
| t=3 | $T_1+T_2$ | a | b | c | $T_3$ | e | f | g | b | c | d | a | f | g | h | e |
| t=4 | a | b | c | d | e | f | g | h | a | b | c | d | e | f | g | h |
| t=5 | a | $T_1+T_2$ | c | d | e | f | $T_3$ | h | d | a | b | c | h | e | f | g |
| t=6 | a | b | c | $T_1+T_2$ | e | f | g | $T_3$ | c | d | a | b | g | h | e | f |
| t=7 | $T_1+T_2$ | a | b | c | $T_3$ | e | f | g | b | c | d | a | f | g | h | e |
| ... | ... | ... | ... | ... | ... | ... | ... | ... | ... | ... | ... | ... | ... | ... | ... | ... |
| t=60 | a | b | c | d | e | f | g | h | a | b | c | d | e | f | g | h |
| t=61 | a | a | $T_1+T_2$ | d | e | f | $T_3$ | h | d | a | b | c | h | e | f | g |
| t=62 | a | b | c | $T_1+T_2$ | e | f | g | $T_3$ | c | d | a | b | g | h | e | f |
| t=63 | $T_1+T_2$ | a | b | c | $T_3$ | e | f | g | b | c | d | a | f | g | h | e |
| ... | ... | ... | ... | ... | ... | ... | ... | ... | ... | ... | ... | ... | ... | ... | ... | ... |
| t=76 | a | b | c | d | e | f | g | h | a | b | c | d | e | f | g | h |
| t=77 | a | $T_1+T_2$ | c | d | e | f | $T_3$ | h | d | a | b | c | h | e | f | g |
| t=78 | a | b | c | $T_1+T_2$ | e | f | g | $T_3$ | c | d | a | b | g | h | e | f |
| t=79 | $T_1+T_2$ | a | b | c | $T_3$ | e | f | g | b | c | d | a | f | g | h | e |

Fig. 8B

| PROCESS | $H_0^{(i)}$ | $H_1^{(i)}$ | $H_2^{(i)}$ | $H_3^{(i)}$ | $H_4^{(i)}$ | $H_5^{(i)}$ | $H_6^{(i)}$ | $H_7^{(i)}$ |
|---|---|---|---|---|---|---|---|---|
| Compute | $H_0^{(i-1)}+a$ | $H_1^{(i-1)}+b$ | $H_2^{(i-1)}+c$ | $H_3^{(i-1)}+d$ | $H_4^{(i-1)}+e$ | $H_5^{(i-1)}+f$ | $H_6^{(i-1)}+g$ | $H_7^{(i-1)}+h$ |

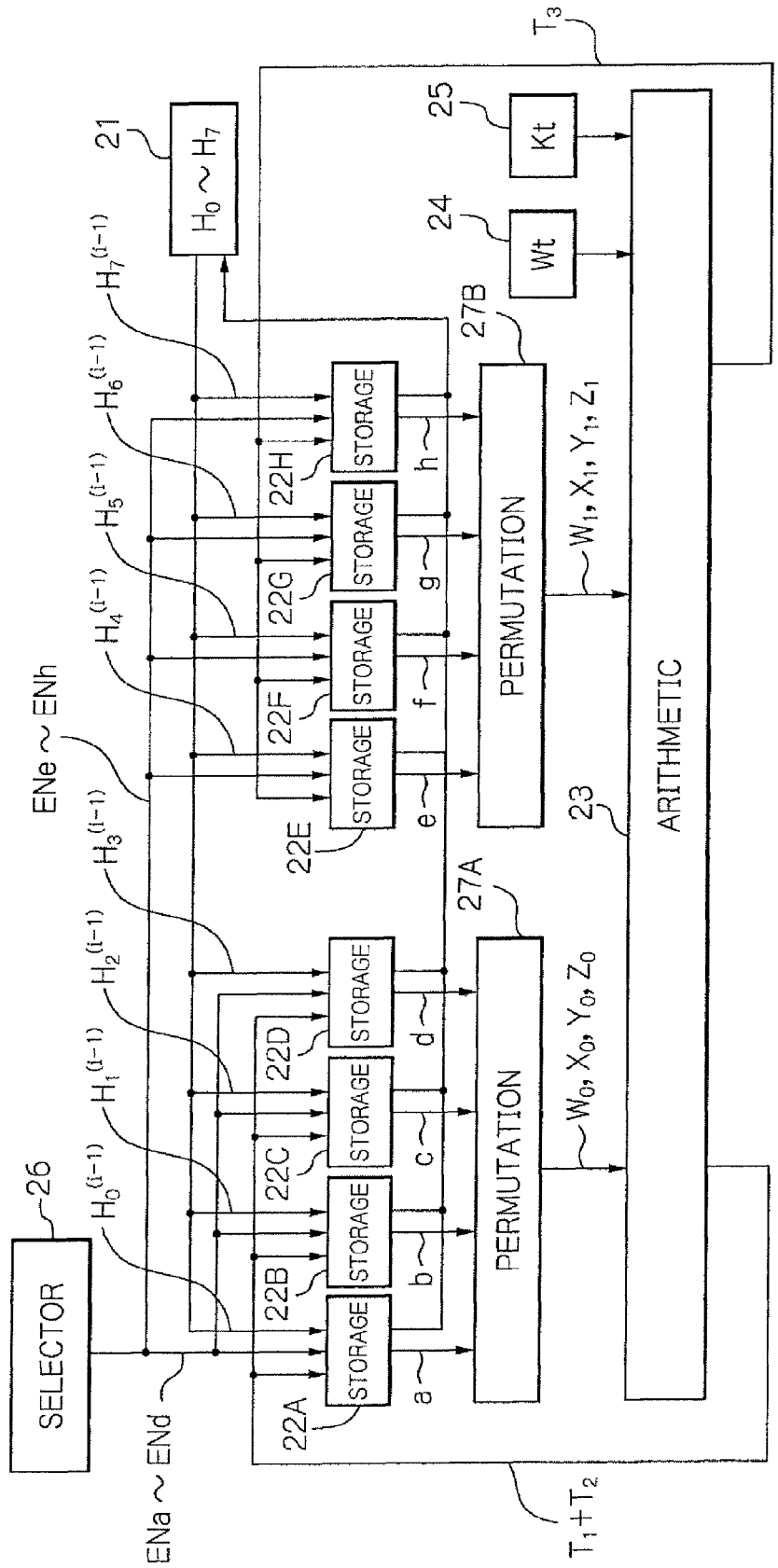

METHOD AND A CIRCUIT FOR SHA OPERATION WITH POWER SAVED

BACKGROUND OF THE INVENTION

1. Field of the Invention

The present invention relates to a Secure Hash Algorithm (SHA) operation method, a SHA operation circuit and a hash operation circuit for calculating the hash value of input data.

2. Description of the Background Art

In recent years, there is a growing trend toward hardware implementation of security algorithms for speeding up security processes. Because of this, in many cases, Secure Hash Algorithm (SHA) is implemented with digital operation circuits. The SHA is used in authentication, digital signature and tamper detection and implemented with one of several algorithms, such as SHA-1, SHA-224, SHA-256, SHA-384 and SHA-512.

In this situation, it has been proposed to use a pipeline for performing hash operation at a high speed in a conventional SHA high speed arithmetic circuit, for example, as described in Japanese patent laid-open publication No. 2002-287635.

However, in the case of the conventional circuit, while the hash operation can be speeded up, it is difficult to reduce the power consumption of the hardware which is used for the hash operation. It is therefore necessary to reduce the power consumption of the hardware which is used for the SHA operation.

SUMMARY OF THE INVENTION

It is an object of the present invention to provide a SHA operation method, a SHA operation circuit and a hash operation circuit, in which it is possible to reduce the power consumption of the hardware.

In accordance with the present invention, a SHA operation method comprises a store step of storing, in first to fifth storages, first to fifth variables for use in a hash operation on the basis of the SHA-1 algorithm, a permutation step of permuting the first to fifth variables are stored as first to fifth intermediate values, respectively, a first calculation step of calculating a temporary value of the SHA-1 algorithm by the use of input data and the first to fifth intermediate values permuted, a selection step of selecting one of the first to fifth storages which is for use in storing the intermediate value calculated, a maintenance step of storing the temporary value in the selected storage, bitwise-rotating one of the variables which is stored in another of the storages to store a resultant value in the other storage, and maintaining the variables stored in the remaining storages without change, said maintenance step being performed successively in a timing in synchronization with clock cycles, and a second calculation step of calculating the hash value of the input data by the use of the variables held in the storages.

In an aspect of the invention, when at least one of the first to fifth intermediate values is permutated by bitwise rotation, in said calculation step, the temporary value is calculated by the use of the intermediate values bitwise rotated, and said maintenance step maintains, while the temporary value calculated by the use of the intermediate values is stored in the selected storage, the variable stored in the other storage without bitwise rotation as well as the variables stored in the remaining storages.

Further, in accordance with the present invention, a SHA operation method comprises a store step of storing, in first to eighth storages, first to eighth variables for use in calculating the hash value of input data on the basis of a SHA-2 algorithm, a permutation step of permuting the first to eighth variables stored as first to eighth intermediate values, a first calculation step of calculating a first and a second temporary value of the SHA-2 algorithm by the use of the input data and the first to eighth intermediate values permuted, a selection step of selecting two of the first to eighth storages for use in storing the intermediate values calculated respectively, a maintenance step of storing the temporary values in the selected storages, and maintaining the variables stored in the remaining storages without change, said maintenance step being performed successively in a timing in synchronization with clock cycles, and a second calculation step of calculating the hash value of the input data by the use of the variables held in the storages.

Furthermore, in accordance with the present invention, a SHA operation circuit comprises a permutation section permuting first to fifth variables stored in first to fifth storages, respectively, for use in a hash operation on the basis of the SHA-1 algorithm as first to fifth intermediate values, respectively, an arithmetic unit calculating a temporary value of the SHA-1 algorithm by the use of input data and the first to fifth intermediate values permuted, a selector selecting one of said first to fifth storages which is for use in storing the intermediate value calculated, said first to fifth storages being operable in synchronization with clock cycles to store the temporary value in said selected storage, to bitwise-rotate the variable stored in another of the storages to store a resultant value in said other storage, and to maintain the variables stored in remaining ones of said storages without change, and a hash holder operable to calculate the hash value of the input data by the use of the variables stored in said first to fifth storages and holding the hash value.

Further, in accordance with the present invention, a SHA operation circuit comprises a permutation section permuting first to eighth variables stored in first to eighth storages, respectively, for use in a hash operation on the basis of the SHA-2 algorithm, as first to eighth intermediate values, respectively, an arithmetic unit calculating a first and a second temporary value of the SHA-2 algorithm by the use of input data and the first to eighth intermediate values permuted, a selector selecting two of said first to eighth storages for use in storing the first and second intermediate values calculated respectively, said first to eighth storages being sequentially operable in synchronization with clock cycles to store the first and second temporary values in said selected storages respectively, and maintaining the variables stored in the remaining storages without change, and a hash holder calculating the hash value of the input data by the use of the variables stored in said first to eighth storages and holding the hash value.

Moreover, in accordance with the present invention, a hash operation circuit is provided for generating a message digest on the basis of a hash algorithm from input data partitioned into a plurality of blocks which are sequentially processed one after another, wherein each block is partitioned into a plurality of data segments and processed by sequentially processing the data segments one after another. Said hash operation circuit comprises a hash holder holding intermediate hash values, a plurality of storages connected to said hash holder and operable to store arithmetic values, a permutation section connected to said plurality of storages and operable to permute the arithmetic values, an arithmetic unit connected to said permutation section and said storages for performing an arithmetic operation on input data and the arithmetic values permuted on the basis of the hash algorithm and partially replacing the arithmetic values stored in said plurality of storages by the result of the arithmetic operation in accordance with the hash algorithm. Said plurality of storages, permutation section and arithmetic unit are synchronously driven in order to repeatedly process the arithmetic values while the data segments are input one after another as the input data. When all the data segments of each block are processed, said hash holder holds next intermediate hash values that are calculated on the basis of the arithmetic values stored in said storages and the previous intermediate hash values, and initializes the arithmetic values by the next intermediate hash values for starting processing the next block, wherein after processing all the blocks the message digest is formed from the intermediate hash values. The permutation is performed in order that, when each data segment is processed, at least one of said plurality of storages is supplied with no clock signal to thereby maintain the values stored therein without change.

BRIEF DESCRIPTION OF THE DRAWINGS

The objects and features of the present invention will become more apparent from consideration of the following detailed description taken in conjunction with the accompanying drawings in which:

FIGS. 1A and 1B show the relationship between the hash values and time in an ordinary SHA-1 operation process;

FIG. 2 is a schematic block diagram showing the ordinary SHA-1 operation circuit;

FIGS. 3A and 3B show the relationship between the hash values and time in a SHA-1 operation process in accordance with an illustrative embodiment of the present invention;

FIGS. 6A and 6B show an example of a modified SHA-1 operation process of the embodiment shown in FIGS. 3A and 3B;

FIGS. 7A and 7B show, like FIGS. 1A and 1B, the relationship between the hash values and time in an ordinary SHA-2 operation process;

FIGS. 8A and 8B show, like FIGS. 3A and 3B, the relationship between the hash values and time in a SHA-2 operation process in accordance with an alternative embodiment of the present invention; and FIG. 9 is, similar to FIG. 4, a schematic block diagram showing the alternative embodiment of the SHA-2 operation circuit in accordance with the present invention;

DESCRIPTION OF THE PREFERRED EMBODIMENTS

Figure 4:
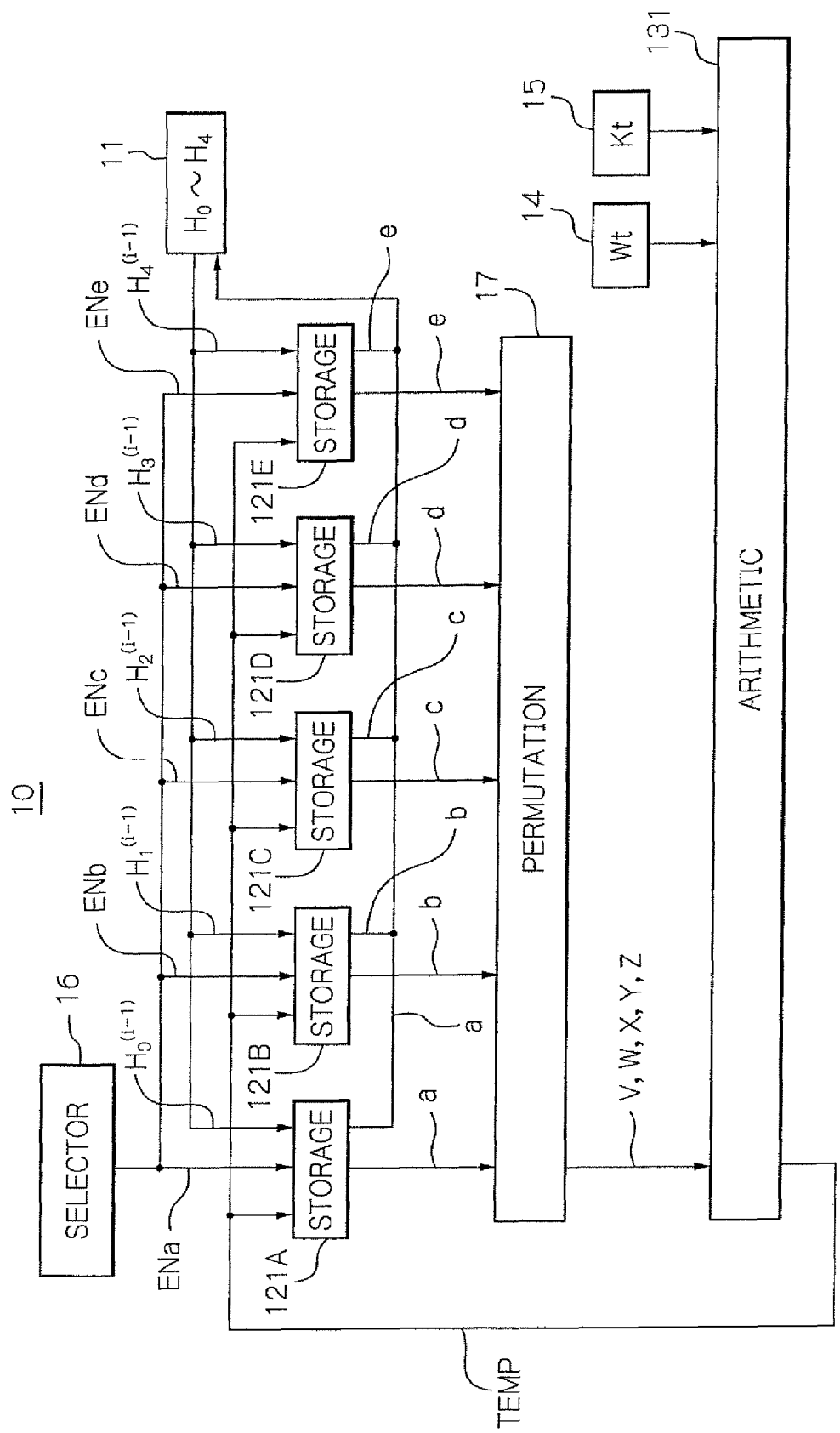
FIG. 4 is a schematic block diagram showing the illustrative embodiment of a SHA-1 operation circuit in accordance with the present invention.

An illustrative embodiment of a hash operation process of the SHA-1 algorithm according to the present invention will hereinafter be described. Meanwhile, in what follows, like elements and components are designated with the same reference numerals, and no redundant description is repeated thereon.

In advance of describing the illustrative embodiment, the hash arithmetic operation according to SHA-1 will be described on the basis of the specifications prescribed by the Federal Information Processing Standards Publication (FIPS PUB) 180-2, "Secure Hash Standard", published by the National Institute of Standards and Technology.

First, a message as target or input data of the hash operation is padded to make the total length of the padded message a multiple of 512 bits. The process of padding is specified in the above Secure Hash Standard. The message is then partitioned into 512-bit blocks, which are named blocks $M^{(1)}$, $M^{(2)}$, ... and $M^{(N)}$ respectively where N is an positive integer. The message can have any length less than 2 bits.

Next, the blocks $M^{(1)}$, $M^{(2)}$, ... and $M^{(N)}$ are processed one after another in this order respectively in the following steps 1 and 2.

In step 1, each block $M^{(i)}$ (i=1 to N) is partitioned into 32-bit words $W_0$, $W_1$, ... and $W_{15}$ ($W_t$: t=0 to 15). In step 2, each block $M^{(i)}$ is processed to generate intermediate hash values $H_0^{(i)}$ to $H_4^{(i)}$ (i=1 to N) by the use of 32-bit length variables a, b, c, d and e. In other words, the step 2 is implemented by a one-way compression function serving to compress each 512-bit block $M^{(i)}$ into a 160-bit intermediate hash value. This intermediate hash value is used as the start hash value by the one-way compression function when compressing the next block $M^{(i+1)}$. The hash value or message digest can be obtained after processing the final block $M^{(N)}$.

Next, the process in step 2 will be described with reference to FIGS. 1A and 1B. In FIGS. 1A and 1B, the relationship between the hash values and time is shown in the form of tables useful for understanding an ordinary SHA-1 operation process. As shown in FIG. 1A, at first, when i=1, the variables "a" to "e" are respectively initialized by hash start values $H_0^{(0)}$ to $H_4^{(0)}$ in accordance with the specifications of the above Secure Hash Standard.

Next, in each process, i.e. the arithmetic operation performed in one clock cycle, for t=0 to 79, the variables "a" to "e" are successively calculated by the following expressions (1) in the timing on the basis of clock cycles.

$$e=d$$

$$d=c$$

$$c=ROTL^{30}(b)$$

$$b=a$$

$$a=TEMP \quad (1)$$

Incidentally, $ROTL^{30}(b)$ of the expressions (1) is defined as a 30-bit rotation of the variable "b" to the left. Also, TEMP is a temporary variable given in the following expression (2).

$$TEMP=ROTL^5(a)+f_t(b,c,d)+e+K_t+W_t \quad (2)$$

$ROTL^5(a)$ of the expression (2) is defined as a 5-bit rotation of the variable "a" to the left, and each $f_t(b, c, d)$ is defined as a function having three 32-bit arguments, i.e. "b", "c" and "d". Each $K_t$ is a constant given in accordance with the specifications of the above Secure Hash Standard. $W_t$ (t=16 to 79) is successively calculated by the use of $W_t$ (t=0 to 15).

Then, the intermediate hash values $H_0^{(i)}$ to $H_4^{(i)}$ are calculated from the variables "a" to "e" and the previous intermediate hash values $H_0^{(i-1)}$ to $H_4^{(i-1)}$, where i=1 to N, in accordance with the Compute process of FIG. 1B, as the following expressions (3).

$$H_0^{(i)}=H_0^{(i-1)}+a$$

$$H_1^{(i)}=H_1^{(i-1)}+b$$

$$H_2^{(i)}=H_2^{(i-1)}+c$$

$$H_3^{(i)}=H_3^{(i-1)}d$$

$$H_4^{(i)}=H_4^{(i-1)}+e \quad (3)$$

After the above process for obtaining the intermediate hash values is repeated for N times, the message digest or hash value is finally obtained by the following expression (4) where the symbol "∥" is used to denote the bitwise concatenation.

$$H_0^{(N)} \| H_1^{(N)} \| H_2^{(N)} \| H_3^{(N)} \| H_4^{(N)} \quad (4)$$

The above constants, functions and other specifications of SHA-1 are prescribed in the above Secure Hash Standard.

Well, with reference to FIG. 2, a SHA operation circuit for performing the ordinary process operation of SHA-1 will hereinafter be described. FIG. 2 is a schematic block diagram showing an ordinary operation circuit of SHA-1. In the figure, the SHA operation circuit 100 includes a hash holder 11 and five (first to fifth) storages 12A, 12B, 12C, 12D and 12E. In addition to this, the SHA operation circuit 100 includes an arithmetic unit 13, a first constant setting section ($W_t$ setting section) 14 and a second constant setting section ($K_t$ setting section) 15, which are interconnected as illustrated.

The hash holder 11 serves to hold intermediate hash values $H_0$, $H_1$, $H_2$, $H_3$ and $H_4$ in correspondence with the five storages 12A to 12E. More specifically, the hash holder 11 is initialized by hash start values $H_0^{(0)}$ to $H_4^{(0)}$ and then receives and holds the intermediate hash values $H_0^{(i)}$ to $H_4^{(i)}$ from the five storages 12A to 12E.

Each of the storages 12A to 12E is implemented with flip-flops which store the variables "a" to "e" of FIG. 1A, refer to the expressions (1). The arithmetic unit 13 receives the values "a" to "e" from the respective storages 12A to 12E, and calculates the temporary value TEMP on the basis of the values "a" to "e", $K_t$ and $W_t$. The first constant setting section 14 is set to $W_t$ while the second constant setting section 15 is set to $K_t$.

The ordinary operation process of SHA-1 has generally been discussed above. Now, a description will be made of the feature of the operation process of SHA-1 in accordance with the illustrative embodiment.

FIGS. 3A and 3B show on tables the relationship between the hash values and time in the SHA-1 operation process in accordance with the illustrative embodiment. The operation process in accordance with the illustrative embodiment of FIGS. 3A and 3B is specifically featured in that TEMP is obtained by the use of 32-bit intermediate values "v" to "z" to be described below. By this configuration, as compared with the operation process of FIGS. 1A and 1B, the number of times the values "a" to "e" stored in the flip-flops change can be decreased. The following description will therefore be focused on the features of the present embodiment differing from the above operation process of FIGS. 1A and 1B.

As shown in FIG. 3A, when i=1, i.e. for the block $M^{(1)}$, the values "a" to "e" are initialized by hash start values $H_0^{(0)}$ to $H_4^{(0)}$ which are specified in the above Secure Hash Standard. When N≧i>1, in this initialization process, the Compute process of FIG. 3B is performed, and the values "a" to "e" are initialized by the results of the Compute process in advance of starting the process of the next block.

In each process for t=0 to 79, one of the values "a" to "e" is used to save the temporary value TEMP while another value "*" of the values "a" to "e" is used to save ROTL$^{30}$ (*); as will be more accurately described in the following. The remaining three values are maintained as they are in the previous process.

For example, when t=1, the value "d" is used to save TEMP, and the value "a" is used to save ROTL$^{30}$ (a). On the other hand, the remaining values "b", "c" and "e" hold the previous values ("b", "c" and "e) which are loaded in the previous process when t=0. It will be understood that, by this processes shown in FIG. 3A, the number of times the values "a" to "e" change can be decreased, as compared with the operation process of FIG. 1A.

The temporary value TEMP of FIG. 3A is calculated by the use of $K_t$, $W_t$ and the intermediate values "v" to "z" on the basis of the following expression (5).

$$TEMP = ROTL^5(v) + f_t(w,x,y) + z + K_t + W_t \quad (5)$$

Incidentally, ROTL$^5$ (v) of the expression (5) is defined as a 5-bit rotation of the value "v" to the left. In this case, the values "a" to "e" are permuted and used as the intermediate values "v" to "z" in a one-to-one correspondence. This correspondence is cyclically changed as shown in FIG. 3A.

For example, when t=0, the values "a" to "e" after initialization are used as the variables of the expression (5) after permutation as v=a, w=b, x=c, y=d and z=e. Also, when t=1, the values "a" to "e" obtained after t=0 are used as the variables of the expression (5) after permutation as v=e, w=a, x=b, y=c and z=d, refer to FIG. 3A.

After completing the operation process through t=0 to 79, the Compute process of FIG. 3B is performed to obtain the intermediate hash values $H_0^{(i)}$ to $H_4^{(i)}$ which are equivalent to those obtained by the Compute process of FIG. 1B. The arithmetic expressions of FIG. 3B are equivalent to those FIG. 1B corresponding to the expressions (3).

This is because when t=0, 5, ... 70, 75, the correspondence relationship between the intermediate values "v" to "z" and the values "a" to "e" is the same as v=a, w=b, x=c, y=d and z=e, refer to FIG. 3A. Namely, while the correspondence relationship recurs with a five-process cycle, 80 processes (t=0 to 79) are a multiple of the five-process cycle so that permutation of the intermediate values "v" to "z" need not be performed in the Compute process.

As has been discussed above, in accordance with the operation process of FIG. 5A, one of the values "a" to "e" is replaced by the temporary value TEMP while another value is replaced by the ROTL$^{30}$ value, and the remaining three values are maintained as they are in the previous process. Because of this, as compared with FIG. 1A, the number of times the values "a" to "e" change is decreased throughout the entire process.

Next, a SHA operation circuit or SHA calculation device for performing the hash operation of SHA-1 of FIGS. 3A and 3B will hereinafter be described with reference to FIG. 4. FIG. 4 is a schematic block diagram showing the illustrative embodiment of the SHA-1 operation circuit in accordance with the present invention. In FIG. 4, the SHA operation circuit 10 includes a hash holder 11, first to fifth storages 121A to 121E, an arithmetic unit 131, a first constant setting section 14 and a second constant setting section 15, which are interconnected as illustrated. In addition to this, the SHA operation circuit 10 further includes a selector 16 and a permutation section 17 interconnected as depicted. Meanwhile, the hash holder 11, the first constant setting section 14 and the second constant setting section 15 may be the same as FIG. 2.

The selector 16 selects one of the storages in which TEMP is to be stored in accordance with the operation process of FIG. 3A. At the same time, the selector 16 selects another of the storages in which the result of the ROTL$^{30}$ operation is to be stored. In order to perform the selection, the selector 16 generates predetermined selection signals ENa to ENe to the storages to be selected. For example, when t=0 in FIG. 3A, the selector 16 outputs the selection signal ENe to the storage 121E in order to store TEMP in the storage 121E. On the other hand, the selector 16 outputs the selection signal ENb to the storage 121B in order to store the result of the operation ROTL$^3$, i.e. ROLT$^{30}$ (b) in the storage 121B.

The permutation section 17 is made, for example, of a number of 5-1 selectors which serve to output the values "a" to "e", which are acquired from the respective storages 121A to 121E, as the intermediate values "v" to "z" after permutation in accordance with the correspondence relationship stored in FIG. 3A. For example, when t=0 in FIG. 3A, the permutation section 17 outputs the values "a" to "e" obtained from the respective storages 121A to 121E as the intermediate values "v" to "z" without permutation.

The arithmetic unit 131 calculates TEMP on the basis of the intermediate values "v" to "z" obtained from the permutation section 17, $W_t$ output from the first constant setting section 14, and $K_t$ output from the second constant setting section 15 in accordance with the process of FIG. 3A. The operation performed by the arithmetic unit 131 is based on the expression (5).

Each of the storages 121A to 121E is implemented with flip-flops or a 32-bit D-type of latch which store predetermined one of the values "a" to "e", TEMP or the $ROTL^{30}$ value, in accordance with the selection signal output from the selector 16. Then, after completing the process when t=79, the respective storages 121A to 121E outputs the values "a" to "e" to the hash holder 11. Receiving the values "a" to "e", the hash holder 11 performs the Compute process of FIG. 3B to obtain the intermediate hash values $H_0^{(i)}$ to $H_4^{(i)}$ on the basis of the values "a" to "e" and the previous hash values $H_0^{(i-1)}$ to $H_4^{(i-1)}$.

For example, when t=1, the storage 121D is used to save TEMP, and the storage 121A is used to save the result of the $ROTL^{30}$ (a) operation. Then, the remaining storages 121B, 121C and 121E hold the previous values ("b", "c" and "e), as they are, which are loaded in the previous process. By this configuration, no value is moved along the storages 121A to 121E of FIG. 4, unlike the storages 12A to 12E of FIG. 2 along which values are moved, i.e. shifted. Accordingly, it is possible to decrease the number of times of driving the respective storages 121A to 121E and thereby reduce the power consumption of the SHA operation circuit 10.

The first storage 121A will specifically be described with reference to FIG. 5. It is noted that the other storages 121B to 121E may be constructed like the storage 121A.

Figure 5:
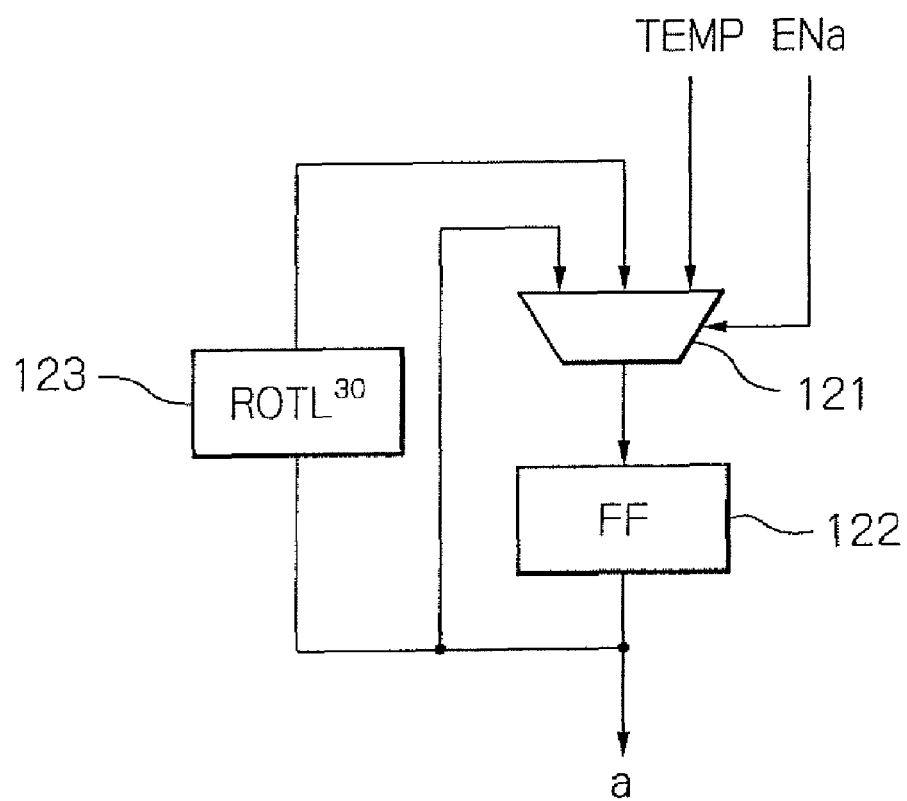
FIG. 5 is a schematic block diagram showing part of a first storage of the SHA-1 operation circuit of the embodiment shown in FIG. 4.

In FIG. 5, the first storage 121A includes a selector 121, a flip-flop 122 (32-bit flip-flop or D-type of latch), and a ROTL operation section 123. When the selection signal ENa indicates loading the value of TEMP (for example, when t=4, 9, ... or 79 as shown in FIG. 3A), the selector 121 transfers the value of TEMP from the arithmetic unit 131 to the flip-flop 122. On the other hand, when the selection signal ENa indicates the ROTL operation (for example, when t=1, 6, ... 71 or 76 as shown in FIG. 3A), the selector 121 transfers $ROTL^{30}$ (a) from the ROTL operation section 123 to the flip-flop 122. Furthermore, when the selection signal ENa indicates maintaining the previous value (for example, when t=0, 2, 3, ..., 75, 77 and 78 as shown in FIG. 3A), the selector 121 does not change the value of the flip-flop 122.

As has been discussed above, the SHA operation circuit 10 of FIG. 4 includes the permutation section 17 which serves to output the values "a" to "e" as the intermediate values "v" to "z" after permutation, the arithmetic unit 131 which serves to calculate TEMP on the basis of the intermediate values "v" to "z", and the selector 16 which selects ones of the first to fifth storages 121A to 121E for respectively storing TEMP and the result of the ROTL operation. Because of this, one of the first to fifth storages 121A to 121E is used to save TEMP while another storage is used to save the result of the ROTL operation, and the remaining three storages are maintained as they are in the previous states. Therefore, unlike the process stored in FIG. 2, the data transfer or shift operation along the respective storages is no longer needed. Accordingly, it is possible to decrease the number of times of driving the respective storages 121A to 121E and thereby reduce the power consumption of the SHA operation circuit 10.

Particularly, in the case of cellular phones, mobile devices, intelligent transport systems (ITSs) and the like implemented with a number of battery-powered circuits, it is effective to use the SHA operation circuit 10 or the SHA operation method of FIGS. 3A and 3B.

Furthermore, the clock supply to the respective storages 121A to 121E may be performed through a clock gating circuit in order to halt the clock supply to the storages which maintain the values stored therein. In this case, it is possible to further reduce the power consumption.

Moreover, the SHA-1 operation process in accordance with the embodiment of the present invention may be modified as described hereinafter. FIGS. 6A and 6B show an example modified from the SHA-1 operation process of the illustrative embodiment. In the processes of FIGS. 6A and 6B, unlike the process operation of FIGS. 3A and 3B, further three 32-bit intermediate values, i.e. secondary intermediate values, xtemp, ytemp and ztemp are introduced, and TEMP is calculated on the basis of xtemp, ytemp and ztemp. By this configuration, all the storages storing the values "a" to "e" need not store the value by performing the $ROTL^{30}$ operation, and thereby it is possible to further decrease the number of times the values "a" to "e" change. The following description will therefore be focused on the features differing from the above operation process of FIGS. 3A and 3B.

As shown in FIG. 6A, when i=1, i.e. for the block $M^{(1)}$, the values "a" and "b" are initialized by hash start values $H_0^{(0)}$ to $H_1^{(0)}$ which are specified in the above Secure Hash Standard in the same manner as in FIG. 3A. However, unlike in the initialization process of FIG. 3A, when i=1, the remaining three values "c" to "e" are initialized by rotation values of the hash start values $H_2^{(0)}$ to $H_4^{(0)}$, i.e. $ROTR^{30}$ ($H_2^{(0)}$) to $ROTR^{30}$ ($H_4^{(0)}$). Incidentally, $ROTR^{30}$ (x) is defined as a 30 bit rotation of the value x to the right.

Next, in each process for t=0 to 79, one of the values "a" to "e" is used to save the temporary value TEMP while the remaining four values are maintained as they are in the previous process.

For example, when t=1, the value "d" is used to save TEMP, and the remaining values "a" to "c" and "e" are maintained as they are in the previous process when t=0. By this configuration, it will be understood that the number of times the values "a" to "e" of FIG. 6A change can be further decreased as compared with the process operation of FIGS. 3A and 3B.

In this case, TEMP of FIG. 6A is calculated by the use of the intermediate value "v", "w" and xtemp to ztemp in accordance with the following expressions (6). On the other hand, the values "a" to "e" are permuted and used as the intermediate values "v", "w" and xtemp, ytemp and ztemp in a one-to-one correspondence. This correspondence is cyclically changed as shown in FIG. 6A.

$$TEMP = ROTL^5(v) + f_t(w,x,y) + z + K_t + W_t$$

$$x = ROTL^{30}(xtemp)$$

$$y = ROTL^{30}(ytemp)$$

$$z = ROTL^{30}(ztemp) \quad (6)$$

For example, when t=0, the values "a" to "e" after the Initialize process are used as the variables of the expressions (6) after permutation as v=a, w=b, xtemp=c, ytemp=d, and ztemp=e. Also, for example, when t=1, the values "a" to "e" obtained after t=0 are permuted as v=e, w=a, xtemp=b, ytemp=c, ztemp=d, refer to FIG. 6A.

Then, in the Compute process of FIG. 6B, the two intermediate hash value $H_0^{(i)}$ and $H_1^{(i)}$ are given by the same arithmetic expressions as in FIG. 3B. In contrast to this, unlike the Compute process of FIG. 3B, the remaining three intermediate hash values $H_2^{(i)}$ to $H_4^{(i)}$ are calculated by adding $ROTL^{30}$ (c), $ROTL^{30}$ (d) and $ROTL^{30}$ (e) to the previous intermediate hash values $H_2^{(i-1)}$ to $H_4^{(i-1)}$ respectively. By this process, the intermediate hash values $H_0^{(i)}$ to $H_4^{(i)}$ of FIG. 6B become equivalent to the intermediate hash values $H_0^{(i)}$ to $H_4^{(i)}$ of FIG. 3B.

Incidentally, the reason for adding the $ROTL^{30}$ values to the remaining three intermediate hash values $H_2^{(i)}$ to $H_4^{(i)}$ is as follows. For t=77 to 79 as enclosed with bold line in FIG. 6A, the $ROTL^{30}$ operation to be performed is not performed, and thereby the values "c" to "e" are adjusted in the Compute process of FIG. 6B.

Also, in the Initialize process of FIG. 6A, unlike in the initialization process of FIG. 3A, the three values "c" to "e" are initialized by rotation values of the hash start values $H_2^{(0)}$ to $H_4^{(0)}$, i.e. $ROTR^{30}$ ($H_2^{(0)}$) to $ROTR^{30}$ ($H_4^{(0)}$). This is because for t=0 to 2 as encircled with bold line in FIG. 6A, the $ROTL^{30}$ operation is performed on the values "c" to "e" for use in the calculation of TEMP. This is based on the fact that the effect of the $ROTR^{30}$ operation can be cancelled by the $ROTL^{30}$ operation.

As has been discussed above, since TEMP is calculated by the use of the intermediate values xtemp to ztemp introduced anew in the process operation of FIG. 6A, four of the values "a" to "e" are maintained as they are in the previous process. Because of this, it is possible to further decrease the number of times the values "a" to "e" change throughout the entire process as compared with the process operation of FIG. 3A in which the $ROTL^{30}$ value is held as one of the values "a" to "e".

Next, the hash operation circuit for performing the hash arithmetic operation of FIGS. 6A and 6B on the basis of SHA-1 will hereinafter be described with reference to FIG. 4.

The permutation section 17 outputs three of the values "a" to "e" obtained from the respective storages 121A to 121E as the intermediate values xtemp, ytemp and ztemp in accordance with the operation process of FIG. 6A. Furthermore, the permutation section 17 outputs the remaining two of the values "a" to "e" obtained from the respective storages 121A to 121E as the intermediate values "v" and "w" in accordance with the operation process of FIG. 6A.

For example, when t=0, the permutation section 17 outputs the values "c" to "e" obtained from the respective storages 121C to 121E in the Initialize process as the intermediate values xtemp, ytemp and ztemp respectively. By this process, xtemp=c, ytemp=d and ztemp=e. Furthermore, the permutation section 17 outputs the values "a" and "b" obtained from the respective storages 111A and 121B in the Initialize process as the intermediate values "v" and "w" respectively.

In addition, the permutation section 17 performs the $ROTL^{30}$ operation of xtemp, ytemp and ztemp in accordance with the operation process of FIG. 6A. This $ROTL^{30}$ operation is performed in accordance with the expressions (6).

The arithmetic unit 131 calculates TEMP on the basis of the intermediate values "v" to "z" obtained from the permutation section 17, $W_t$ output from the first constant setting section 14, and $K_t$ output from the second constant setting section 15 in accordance with the process of FIG. 6A. This calculation is performed in accordance with the expressions (6).

Each of the storages 121A to 121E stores predetermined one of the values "a" to "e", TEMP, in accordance with the selection signal output from the selector 16.

For example, when t=1 in FIG. 6A, the storage 121D save the value "d" (=TEMP), and the remaining four storages 121A to 121C and 121E maintain the values "a" to "c" and "e" as they are in the previous process. By this configuration, unlike the process of FIG. 3A, none of the storages 121A to 121E stores the value after performing the $ROTL^{30}$ operation (i.e. the ROTL operation section 123 in FIG. 5 is no longer needed). It is therefore possible to further decrease the number of times of driving the respective storages 121A to 121E and thereby further reduce the power consumption of the SHA operation circuit 10.

Still further, this modification example is particularly advantageous in that it does not require hardware expansion of the SHA operation circuit 10.

In accordance with the expressions (6), three rotation operations are performed for each process, whereas only one operation is performed in the case of the process shown in FIGS. 3A and 3B. If the expressions (6) are implemented by software or firmware, these three rotation operations would increase power consumption. However, in the instant alternative embodiment, these rotation operations can be implemented by hardwired rotation between the output of the permutation section 17 and the input of the arithmetic unit 131, because the rotation amount is fixed. More specifically speaking, the rotation operation is implemented by simply connecting the output of the permutation section 17 directly to the input of the arithmetic unit 131 with permutation of bit positions to realize the rotation. For example, in the case where xtemp is bitwise rotated, the i-th bit of the output of the permutation section 17 corresponding to xtemp is connected simply to the j-th bit of the input of the arithmetic unit 131 corresponding to the value "x", wherein j=(i+2) mod 32.

Now, a description will be made on a power verification simulation of a 0.15 μm semiconductor process which was conducted in accordance with the process of FIGS. 6A and 6B. This simulation was conducted by the use of gated clocks as described above.

For example, under a first condition (a power supply voltage of 1.65 V, an ambient temperature of −40° C.), the power consumption of the SHA operation circuit 100 (refer to FIGS. 1A, 1B and 2) was 7.1 mW, but the power consumption of the SHA operation circuit 10 (refer to FIGS. 4, 6A and GB) was 5.5 mW. This indicated that the power saving effect was about 23%.

Furthermore, under a second condition (a power supply voltage of 1.35 V, an ambient temperature of 125° C.), the power consumption of the SHA operation circuit 100 (refer to FIGS. 1A, 1B and 2) was 5.3 mW, but the power consumption of the SHA operation circuit 10 (refer to FIGS. 4, 6A and 6B) was 3.6 mW. This indicated that the power saving effect was about 32%.

Now, an alternative embodiment of hash operation process of the SHA-2 algorithm according to the present invention will herein after be described. In the alternative embodiment, the hash arithmetic operation will be described on the basis of SHA-2 (SHA-224, 256, 384 and 512) in a simplified description for the sake of clarity.

In advance of describing the alternative embodiment, the ordinary SHA-2 hash arithmetic operation will be described. First, a message as target data of the hash operation is padded to make the total length of the padded message a multiple of blocks having a predetermined bit length (512 bits in the case of SHA-224 or 256, 1024 bits in the case of SHA-384 or 512) in accordance with the above Secure Hash Standard, and then partitioned into blocks having the predetermined bit length, which are named blocks $M^{(1)}, M^{(2)}, \ldots$ and $M^{(N)}$ respectively, where N is an positive integer.

Next, the blocks $M^{(1)}, M^{(2)}, \ldots$ and $M^{(N)}$ are processed one after another in this order respectively in the following steps 1A and 2A.

In step 1A, each block $M^{(i)}$ is partitioned into 16 words $W_0$, $W_1, \ldots$ and $W_{15}$ ($W_t$: t=0 to 15). A word equals a 32-bit string in the case of SHA-224 or 256. In the case of SHA-384 or 512, however, a 64-bit string is handled as one word or data segment corresponding to the value of a variable in SHA calculation.

In step 2A, each block $M^{(i)}$ (i=1 to N) is processed to generate an intermediate hash value $H_0^{(i)}$ to $H_7^{(i)}$ (i=1 to N) by the use of variables "a", "b", "c", "d", "e", "f", "g" and "h" having the bit length corresponding to the word. Namely, the bit length is 32 bits in the case of SHA-224 or 256, and 64 bits in the case of SHA-384 or 512.

Next, the process in step 2A will be described with reference to FIGS. 7A and 7B. In FIGS. 7A and 7B, the relationship between the hash value and time is shown in the form of table useful for understanding an ordinary SHA-2 operation process.

As shown in FIG. 7A, when i=1, the values "a" to "h" are initialized by hash start values $H_0^{(0)}$ to $H_7^{(0)}$ which are specified in the above Secure Hash Standard. When $N \geq i > 1$, in this initialization process, the Compute process of FIG. 7B is performed, and the values "a" to "e" are initialized by the results of the Compute process in advance of starting the process of the next block.

Next, in each process for t=0 to 79, the variables "a" to "h" are successively calculated by the following expressions (7). FIG. 7A illustrates 80 processes of SHA-224 or 256. In the case of SHA-384 or 512, there are 64 processes for t=0 to 63.

$$h=g$$
$$f=e$$
$$e=T_1+d$$
$$d=c$$
$$c=b$$
$$b=a$$
$$a=T_1+T_2 \quad (7)$$

The values of $T_1$ and $T_2$ of the expressions (7) are given by the following expressions (8). In this description, $T_3=T_1+d$ for the sake of clarity in description.

$$T_1=\Sigma_1(e)+Ch(e,f,g)+h+K_t+W_t$$
$$T_2=\Sigma_0(a)+Maj(a,b,c) \quad (8)$$

where the values $\Sigma_0$, $\Sigma_1$, Ch, Maj, $K_t$ and $W_t$ are specified in the above Secure Hash Standard.

Then, the intermediate hash values $H_0^{(i)}$ to $H_7^{(i)}$ where i=1 to N, are calculated by the following expressions (9) as shown in the Compute process of FIG. 7B.

$$H_0^{(i)}=H_0^{(i-1)}+a$$
$$H_1^{(i)}=H_1^{(i-1)}+b$$
$$H_2^{(i)}=H_2^{(i-1)}+c$$
$$H_3^{(i)}=H_3^{(i-1)}+d$$
$$H_4^{(i)}=H_4^{(i-1)}+e$$
$$H_5^{(i)}=H_5^{(i-1)}+f$$
$$H_6^{(i)}=H_6^{(i-1)}+g$$
$$H_7^{(i)}=H_7^{(i-1)}+h \quad (9)$$

After the above process for obtaining the intermediate hash values is repeated for N times, the message digest is finally obtained by the following expression (10).

$$H_0^{(N)}\|H_1^{(N)}\|H_2^{(N)}\|H_3^{(N)}\|H_4^{(N)}\|H_5^{(N)}\|H_6^{(N)}\|H_7^{(N)} \quad (10)$$

The above constants, functions and other specifications of SHA-2 are specified in the Secure Hash Standard of FIPS PUB 180-2 and in addition in the Change Notice to include SHA-224.

Now, a SHA-2 operation process and a SHA-2 operation circuit in accordance with the alternative embodiment of the present invention will be described with reference to FIGS. 5A and 5B showing in the form of tables the relationship between the hash values and time in a SHA-2 operation process in accordance with the alternative embodiment. In this case, SHA-224 or 256 is illustrated with 80 processes for t=0 to 79, but in the case of SHA-384 or 512, there are 64 processes for t=0 to 63.

The operation process in accordance with the alternative embodiment of FIGS. 8A and 8B is specifically featured in that values $T_1$, $T_2$ and $T_3$ are obtained by the use of intermediate values $w_0$ to $z_0$ and $w_1$ to $z_1$ to be described below. By this configuration, as compared with the process operation of FIGS. 7A and 7B, the number of times the values "a" to "h" change can be decreased. The following description will therefore be focused on the features differing from the above operation process of FIGS. 7A and 7B.

As shown in FIG. 8A, when i=1, i.e. for the block $M^{(1)}$, the values "a" to "h" are initialized by hash start values $H_0^{(0)}$ to $H_7^{(0)}$ which are specified in the above Secure Hash Standard. When $N \geq i > 1$, the Compute process of FIG. 8B is performed in this initialization process.

In each process for t=0 to 79, one of the values "a" to "h" is used to save $T_1+T_2$ while another value is used to save $T_3$. The remaining six values are maintained as they are in the previous process.

For example, when t=1, "c" is used to save $T_1+T_2$, and "g" is used to save $T_3$. The remaining values "a", "b", "d", "e", "f" and "h" are maintained as they are in the previous process when t=0. It will be understood that, by this processes shown in FIG. 5A, the number of times the values "a" to "h" change can be decreased, as compared with the process operation of FIGS. 7A and 7B.

The values $T_1$, $T_2$ and $T_3$ in FIG. 8A are calculated by the use of the first to eighth intermediate values $w_0$ to $z_0$ and $w_1$ to $z_1$ on the basis of the following expressions (11).

$$T_1=\Sigma_1(w_1)+Ch(w_1,x_1,y_1)+z_1+K_t+W_t$$
$$T_2=\Sigma_0(W_0)+Maj(w_0,x_0,y_0)$$
$$T_3=T_1+z_0 \quad (11)$$

In this case, the values "a" to "d" are permuted and used as the intermediate values $w_0$ to $z_0$, and the values "e" to "h" are permuted and used as the intermediate values $w_1$ to $z_1$. This correspondence is cyclically changed as shown in FIG. 3A. For example, when t=0, the values "a" to "h" after initialization are used as the variables of the expressions (11) after permutation as $w_0=a$, $x_0=b$, $y_0=c$, $z_0=d$, $w_1=e$, $x_1=f$, $Y_1=g$ and $z_1=h$. Also, for example, when t=1, the values "a" to "h" obtained after t=0 are permuted as $w_0=d$, $x_0=a$, $y_0=b$, $z_0=c$, $w_1=h$, $x_1=e$, $y_1=f$ and $z_1=g$.

After completing the operation process through t=0 to 79, the Compute process of FIG. 8B is performed to obtain the intermediate hash values $H_0^{(i)}$ to $H_7^{(i)}$ which are equivalent to those obtained by the Compute process of FIG. 7B. The arithmetic expressions of FIG. 5B are equivalent to those FIG. 7B corresponding to the expressions (9).

This is because when t=0, 4, . . . , and 76, the correspondence relationship between the intermediate values $w_0$ to $z_0$ and $w_1$ to $z_1$ and the values "a" to "h" is the same as $w_0$=a, $x_0$=b, $y_0$=c, $z_0$=d, $w_1$=e, $x_1$=f, $y_1$=g, and $z_1$=h, refer to FIG. 8A. Namely, while the correspondence relationship recurs with a four-process cycle, 80 processes (t=0 to 79) are a multiple of the four-process cycle so that permutation of the intermediate values $w_0$ to $z_0$ and $w_1$ to $z_1$ need not be performed in the Compute process.

Incidentally, this is true also in the case of SHA-224 and 256 having 64 processes (t=0 to 63) because 64 processes are a multiple of the four-process cycle. After the above process for obtaining the intermediate hash values is repeated for N times, the message digest is finally obtained by the expression (10).

As has been discussed above, in accordance with the operation process of FIG. 8A, since $T_1$, $T_2$ and $T_3$ are calculated by the use of the intermediate values $w_0$ to $z_0$ and $w_1$ to $Z_1$, each of the values "a" to "h" changes once per four processes to load $(T_1+T_2)$ or $T_3$ as calculated. In the other processes, each of the values "a" to "h" maintains as it is in the previous process. Because of this, as compared with FIG. 7A, the number of times the values "a" to "h" change is decreased throughout the entire process.

Next, the SHA operation circuit or SHA calculation device for performing the hash operation of SHA-2 of FIG. 8 will hereinafter be described with reference to FIG. 9. FIG. 9 is a schematic block diagram showing the alternative embodiment of the SHA-2 operation circuit in accordance with the present invention.

In FIG. 9, the SHA operation circuit 20 includes a hash holder 21, first to eighth storages 22A to 22H, an arithmetic unit 23, a first constant setting section ($W_t$ setting section) 24, and a second constant setting section ($K_t$ setting section) 25, which are interconnected as illustrated. Furthermore, the SHA operation circuit 20 includes a selector 26 and two permutation sections 27A and 27B interconnected as shown. The couple of permutation sections 27A and 27B may be formed as a single permutation section.

The selector 26 selects one of the storages in which $(T_1+T_2)$ or $T_3$ is to be stored in accordance with the operation process of FIG. 8A. In order to perform the selection, the selector 26 generates predetermined selection signals ENa to ENh to the storages to be selected. There are correlations between the selection signals ENa to ENh such that ENa=ENe, ENb=ENf, ENc=ENg and ENd=ENh.

For example, when t=0 in FIG. 8A, the selector 26 outputs the selection signal ENd to the storage 22D in order to store $T_1+T_2$ in the storage 22D. Furthermore, the selector 26 outputs the selection signal ENh to the storage 22H in order to store $T_3$ in the storage 22H.

Each of the permutation sections 27A and 27B is made, for example, of a number of 4-1 selectors which receive the values "a" to "h" acquired from the respective storages 22A to 22H and output the intermediate values $w_0$ to $z_0$ and $w_1$ to $z_1$ after permutation in accordance with the correspondence relationship stored in FIG. 8A.

For example, when t=0 in FIG. 8A, the permutation section 27A outputs the values "a" to "d" obtained from the respective storages 22A to 22D as the intermediate values $w_0$ to $z_0$ without permutation. Also, the permutation 27B outputs the values "e" to "h" obtained from the respective storages 22E to 22H as the intermediate values $w_1$ to $z_1$ without permutation.

The arithmetic unit 23 calculates $(T_1+T_2)$ and $T_3$ on the basis of the intermediate values $w_0$ to $z_0$ obtained from the permutation section 27A, the intermediate values $w_1$ to $z_1$ obtained from the permutation section 27B, $W_t$ output from the first constant setting section 24, and $K_t$ output from the second constant setting section 25 in accordance with the process of FIG. 8A. The operation performed by the arithmetic unit 131 is based on the expressions (11).

The storages 22A to 22D belong to a first group, and the storages 22E to 22H belong to a second group. Each of the storages 22A to 22H is implemented with flip-flops, or a 32-bit or 64-bit 9-type of latch, which store predetermined one of values "a" to "h", $T_1+T_2$, or $T_3$ in accordance with the selection signal output from the selector 26. Then, after completing the process when t=79 (or t=63), the respective storages 22A to 22H outputs the values "a" to "h" to the hash holder 21. Receiving the values "a" to "h", the hash holder 21 performs the Compute process of FIG. 8B to obtain the intermediate hash values $H_0^{(i)}$ to $H_7^{(i)}$ on the basis of the values "a" to "h" and the previous hash values $H_0^{(i-1)}$ to $H_7^{(i-1)}$.

For example, when t=1, the storage 22C is used to save "c"=$T_1+T_2$, and the storage 22G is used to save "g" (=$T_3$). On the other hand, the remaining storages 22A, 22B, 22D to 22F and 22H hold the previous values ("a", "b", "d" to "f" and "h), as they are in the previous process when t=0. By this configuration, no value is moved along the respective storages 22A to 22H during the operation process of FIG. 8A, unlike the respective storages of FIG. 7A along which values are moved or shifted. Each of the storages 22A to 22H holds $(T_1+T_2)$ or $T_3$ only once per four processes.

Accordingly, it is possible to decrease the number of times of driving the respective storages 22A to 22H and thereby reduce the power consumption of the SHA operation circuit 20.

It is to be noted that the present invention is not limited to the specific illustrative embodiments, but rather various modifications may be made. For example, while the storage circuit made of flip-flops is described by way of example, it can be formed with a memory device such as a RAM (Random Access Memory).

Also, while the storage circuits are classified into two groups in the case of the alternative embodiment, this grouping is not requisite.

Furthermore, while there are many implementations of a clock gating circuit for supplying gated clocks to the respective storages as described above, such a clock gating circuit can be incorporated in the permutation section 17 or 27A and 27B, the selector 16 or 26, or the like. For example, some internal signals of the permutation section 17 may be used to generate the gated clocks.

The entire disclosure of Japanese patent application No. 2006-302202 filed on Nov. 8, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A Secure Hash Algorithm (SHA) operation method comprising:
   a store step of storing, in first to fifth storages, first to fifth variables for use in a hash operation on a basis of a SHA-1 algorithm;
   a permutation step of permuting the first to fifth variables stored as first to fifth intermediate values, respectively;
   a first calculation step of calculating a temporary value of the SHA-1 algorithm by use of input data and the first to fifth intermediate values permuted;
   a selection step of selecting one of the first to fifth storages which is for use in storing the temporary value calculated;
   a maintenance step of storing the temporary value in the selected storage, bitwise-rotating one of the variables which is stored in another of the storages to store a resultant value in the other storage, and maintaining the variables stored in remaining ones of the storages without change, said maintenance step being performed successively in a timing in synchronization with clock cycles; and
   a second calculation step of calculating a hash value of the input data by the use of the variables held in the storages;
   wherein when at least one of the first to fifth intermediate values is permuted by bitwise rotation,
   in said first calculation step, the temporary value is calculated by the use of the intermediate values bitwise rotated, and
   said maintenance step maintaining, while the temporary value calculated by the use of the intermediate values is stored in the selected storage, the variable stored in the other storage without bitwise rotation as well as the variables stored in the remaining storages.

2. A Secure Hash Algorithm (SHA) operation method comprising:
   a store step of storing, in first to eighth storages, first to eighth variables, respectively, for use in calculating a hash value of input data on a basis of a SHA-2 algorithm;
   a permutation step of permuting the first to eighth variables stored as first to eighth intermediate values, respectively;
   a first calculation step of calculating a first and a second temporary value of the SHA-2 algorithm by use of the input data and the first to eighth intermediate values permuted;
   a selection of step selecting two of the first to eighth storages for use in storing the temporary values calculated respectively;
   a maintenance step of storing the temporary values in the selected storages, and maintaining the variables stored in remaining ones of the storages without change, said maintenance step being performed successively in a timing in synchronization with clock cycles; and
   a second calculation step of calculating the hash value of the input data by the use of the variables held in the storages.

3. The method in accordance with claim 2, wherein the SHA-2 algorithm is SHA-224, SHA-256, SHA-384 or SHA-512.

4. A Secure Hash Algorithm (SHA) operation circuit comprising:
   a permutation section permuting first to fifth variables stored in first to fifth storages, respectively, for use in a hash operation on a basis of a SHA-1 algorithm as first to fifth intermediate values, respectively;
   an arithmetic unit calculating a temporary value of the SHA-1 algorithm by use of input data and the first to fifth intermediate values permuted;
   a selector selecting one of said first to fifth storages which is for use in storing the temporary value calculated;
   said first to fifth storages being operable in synchronization with clock cycles to store the temporary value in said selected storage, to bitwise-rotate the variable stored in another of the storages to store a resultant value in said other storage, and to maintain the variables stored in remaining ones of said storages without change; and
   a hash holder calculating a hash value of the input data by the use of the variables stored in said first to fifth storages and holding the hash value;
   wherein when at least one of the first to fifth intermediate values is permuted by bitwise rotation,
   said arithmetic unit calculates the temporary value by the use of the intermediate values bitwise rotated, and
   said first to fifth storages are operated in synchronization with clock cycles so that the temporary value calculated by the use of the intermediate values is stored in said selected storage while the variables stored in said remaining storages are maintained as they are without bitwise rotation.

5. A Secure Hash Algorithm (SHA) operation circuit comprising:
   a permutation section permuting first to eighth variables stored in first to eighth storages, respectively, for use in a hash operation on a basis of a SHA-2 algorithm as first to eighth intermediate values, respectively;
   an arithmetic unit calculating a first and a second temporary value of the SHA-2 algorithm by use of input data and the first to eighth intermediate values permuted;
   a selector selecting two of said first to eighth storages for use in storing the first and second intermediate values calculated respectively;
   said first to eighth storages being sequentially operable in synchronization with clock cycles to store the first and second temporary values in said selected storages respectively, and maintaining the variables stored in remaining ones of said storages without change; and
   a hash holder calculating a hash value of the input data by the use of the variables stored in said first to eighth storages and holding the hash value.

6. The circuit in accordance with claim 5, wherein said SHA-2 algorithm is SHA-224, SHA-256, SHA-384 or SHA-512.

7. A hash operation circuit for generating a message digest on a basis of a hash algorithm from input data partitioned into a plurality of blocks which are sequentially processed one after another, wherein each of the plurality of blocks is partitioned into a plurality of data segments and processed by sequentially processing the data segments one after another, said hash operation circuit comprising:
   a hash holder holding intermediate hash values;
   a plurality of storages connected to said hash holder and storing arithmetic values;
   a permutation section connected to said plurality of storages and permuting the arithmetic values; and
   an arithmetic unit connected to said permutation section and said storages and performing an arithmetic operation on input data and the arithmetic values permuted on the basis of the hash algorithm and partially replacing the arithmetic values stored in said plurality of storages by a result of the arithmetic operation in accordance with the hash algorithm, said plurality of storages, said permutation section and said arithmetic unit being synchronously driven in order to repeatedly process the arithmetic values while the data segments are input one after another as the input data, said hash holder, when all the data segments of each of the plurality of blocks are processed, holding next intermediate hash values that are calculated on the basis of the arithmetic values stored in said storages and the previous intermediate hash values, and initializing the arithmetic values by the next intermediate hash values for starting processing next one of the plurality of blocks, the message digest being, after processing all the blocks, formed from the intermediate hash values, said permutation section performing permutation in order that, when each of the data segments is processed, at least one of said plurality of storages is supplied with no clock signal to thereby maintain the values stored in said at least one storage without change.

* * * * *